(No Model.)
G. A. PADDOCK.
HARROW.
No. 397,514. Patented Feb. 12, 1889.
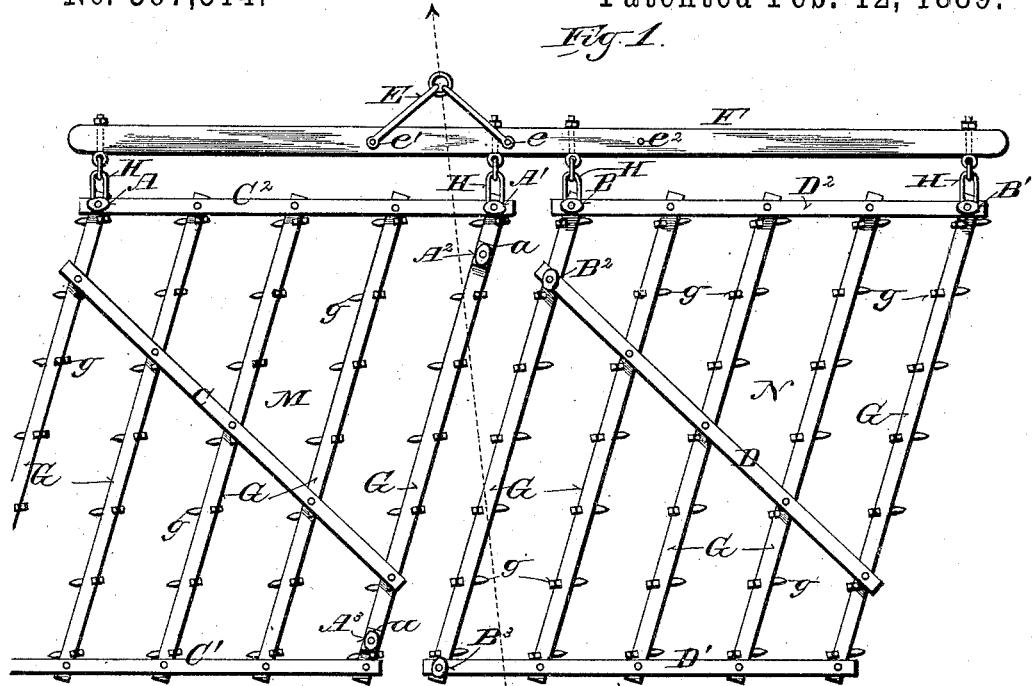
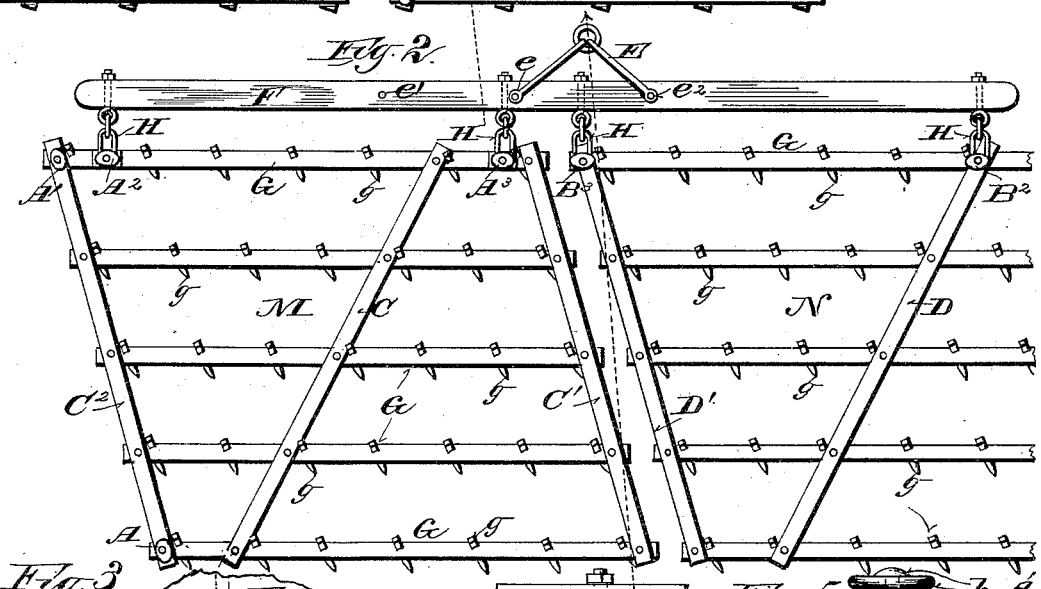
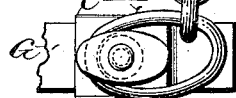
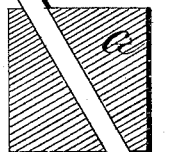
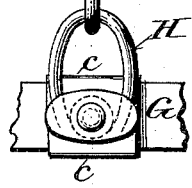
Witnesses:
Inventor:
G. Adolphus Paddock

UNITED STATES PATENT OFFICE.

GUSTAVUS ADOLPHUS PADDOCK, OF BEAVER DAM, WISCONSIN.

HARROW.

SPECIFICATION forming part of Letters Patent No. 397,514, dated February 12, 1889.

Application filed June 9, 1888. Serial No. 276,573. (No model.)

*To all whom it may concern:*

Be it known that I, GUSTAVUS ADOLPHUS PADDOCK, a citizen of the United States, residing at Beaver Dam, in the county of Dodge and State of Wisconsin, have invented a new and useful Improvement in Harrows, of which the following is a specification.

My invention relates to improvements in harrows in which the teeth are rigidly secured to the bars in a slanting direction; and the objects of my invention are, first, to so arrange the draw-bar and attachments that the teeth shall more perfectly work up rough and soddy ground, and, second, to afford means for conveniently changing the implement so as to make it suitable for either light or heavy work. I attain these objects by the construction illustrated in the accompanying drawings, in which—

Figure 1 is a top view of a harrow constructed as proposed by my invention and so arranged as to make the teeth run deeply in the ground. Fig. 2 is a top view of the same when used with the teeth slanting back. Figs. 3, 4, and 5 show the way in which the draw-bar is attached to the harrow; and Fig. 6 shows the way in which the tooth runs through the tooth-bar.

Similar letters relate to similar parts throughout the several views.

The harrow here shown has two sections. Section M is composed of the tooth-bars G and cross-pieces C, C', and C², and in Fig. 1 it is attached to the draw-bar F by the buttons A and A', around which the links H run. The teeth $g$ in this case slant directly to the left and neither to the front or rear. In Fig. 2 this section is turned half-way around toward the left, and the slant of the teeth is mainly backward, the section being attached to the draw-bar by the buttons A² and A³. Section N is built the same as section M, and in Fig. 1 is attached to the draw-bar by buttons B and B', the teeth slanting directly to the right of the line of draft, said line being shown by the dotted line through the center of the harrow. When used as shown in Fig. 2, this section is attached to the draw-bar by the buttons B² and B³, and the teeth slant nearly straight back, or in line of draft shown by the dotted line drawn through the center of Fig. 2. The form of the drawing attachments is not important, the main point being to have the section semi-reversible.

A very convenient semi-reversing attachment is formed by simply using clevises having holes made both in the ends and sides of the frames in the proper place for the clevis-pins.

The advantages of this mode of construction are that the teeth when used as in Fig. 1 do better work than straight teeth, while no extra joints are required for the purpose of slanting the teeth backward when the nature of the work required makes this desirable, as is the case with the reversible harrows in general use.

Figs. 3 and 4 are top views of the link and button, the former showing the position of the link when being buttoned on and the latter showing its position when in use.

Fig. 5 is a rear view of the button A', resting on cross-piece C², and the tooth-bar under said cross-piece, the whole being fastened together by a bolt running through the three. The link H is also shown in this drawing hitched on for use. Flanges $c\,c$ are shown in each of the three last-named drawings, the object of these being to hold the button, of the base of which they form a part, firmly in place, and to prevent the splitting of the bar or cross-piece on which they stand. The smallness of the drawing prevents their being properly shown in Figs. 1 and 2.

The button and bolt may very properly be made of one piece of malleable iron. The button may also be made round and the link wide at the front end, so as to slip on, and on the inner corners of the sections be made to do service in the work represented by both Figs. 1 and 2. The links H are secured to the draw-bar F by eyebolts in the usual manner. The ring by which the implement is drawn is secured to the draw-bar by two long clevises, one of them being secured at all times by a pin through the hole $e$. The other clevis, E, is held by a pin through the hole $e'$ when the harrow is used as shown in Fig. 1; but when the sections are turned the pin is changed to the hole $e^2$, as shown in Fig. 2. By this means the harrow can always be made to track properly.

The buttons A and B may be placed a short distance back from the corner to give more slant to the bars G. The buttons $A^2$ and $B^3$ may also be moved toward or even onto the second bars of their respective frames for the same purpose, the object being to draw by adjacent sides as fronts and keep the proper slant of the bars and teeth.

I claim as my invention—

1. In a harrow, a section containing two or more tooth-bars rigidly secured together, with slanting teeth and semi-reversing attachments, substantially as described.

2. In a harrow, two sections with slanting teeth and semi-reversing attachments, substantially as and for the purposes described.

3. In a harrow, two independent sections attached to a draw-bar, the teeth of each slanting directly out from the other, substantially as shown.

4. In a harrow, a draw-bar adjustable to two adjacent sides of a section, said section containing two or more tooth-bars rigidly connected, substantially as described.

5. In a harrow, the combination, with a draw-bar, of two sections having slanting teeth and semi-reversing attachments, substantially as described.

6. In a harrow, the combination, with two sections, M and N, having their teeth slanted outward from each other, of semi-reversing attachments A and B, fronting two adjacent sides, substantially as described.

7. In a harrow, the combination of two sections, M and N, having semi-reversing attachments A and B, with a draw-bar, F, adjustable to two adjacent sides of each section, substantially as described.

8. In a harrow, the combination, with a button, of a link adjustable to said button, the whole forming a drawing attachment, substantially as described.

9. In a harrow, two sections, each containing two or more tooth-bars rigidly connected, with slanting teeth and semi-reversing attachments, substantially as described.

10. In a harrow, two sections, each containing two or more tooth-bars secured together without joints, and each having its teeth slanted outward from the other, and a draw-bar adjustable to two adjacent sides of each section, substantially as described.

G. ADOLPHUS PADDOCK.

Witnesses:
E. C. PRATT,
W. TALBERT.